June 9, 1931.  J. D. LANGDON  1,808,991
STEERING GEAR FOR AIRSHIPS
Filed April 8, 1929
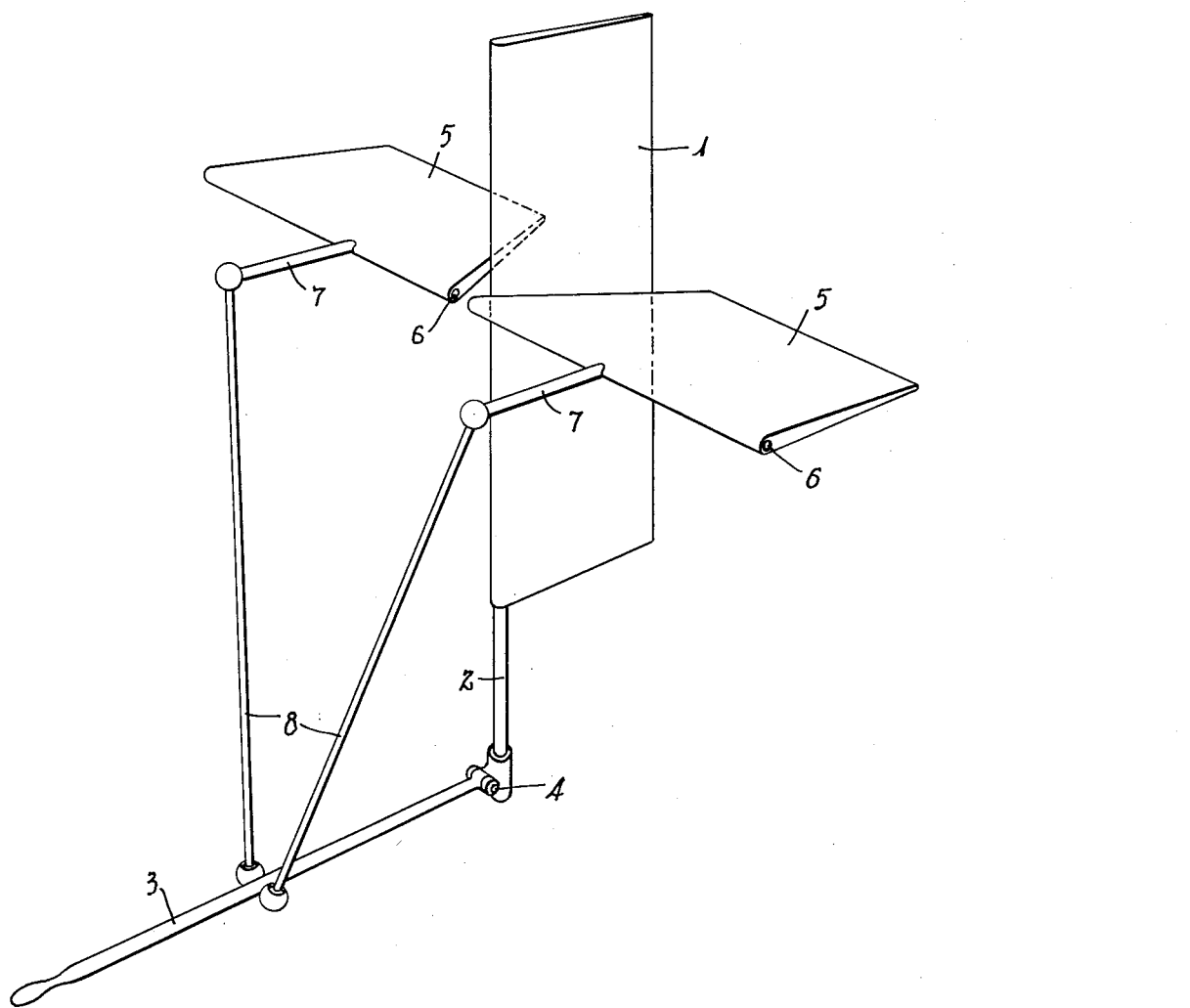
INVENTOR.
BY J. D. Langdon
ATTORNEY.

Patented June 9, 1931

1,808,991

UNITED STATES PATENT OFFICE

JESSE D. LANGDON, OF LOS ANGELES, CALIFORNIA

STEERING GEAR FOR AIRSHIPS

Application filed April 8, 1929. Serial No. 353,623.

The present invention relates to steering gear for airships, and aims to provide a novel and simple means for controlling the rudder and ailerons from a single hand lever or joy-stick.

Another object of the invention is the provision of a novel steering gear of simple construction by means of which the ailerons may both be tilted in the same direction to serve as elevators, and may be tilted in opposite directions in cooperation with the swinging movement of the rudder so as to tilt or bank the airship laterally when making turns.

With the foregoing and other objects in view, which will be apparent as the description proceeds, the invention resides in the construction and arrangement of parts, as hereinafter described and claimed it being understood that changes can be made within the scope of what is claimed, without departing from the spirit of the invention.

The invention is illustrated in the accompanying drawing, wherein the figure is a perspective view of the improved steering gear.

The steering rudder 1 is secured to a substantially vertical shaft 2, which is mounted for rotation, and a hand lever or joy-stick 3 is connected with the shaft 2 by a hinge joint 4 having a horizontal axis so that the lever may be swung upwardly and downwardly.

When the lever 3 is swung sidewise it turns the shaft 2 and rudder 1. The ailerons 5 are located at the opposite sides of the rudder and are mounted for turning movement around transverse horizontal shafts or axes 6.

The ailerons 5 on shafts 6 have lever arms 7 which are connected by converging links or rods 8 with the hand lever 3, ball and socket or universal joints being preferably used.

By swinging the lever 3 upwardly and downwardly the links 8 swing the arms 7 similarly, so as to tilt the ailerons 5 in the same direction, either upwardly or downwardly, to serve as elevators.

When the lever 3 is swung sidewise to turn the rudder 1, the lever being moved toward a position below one of the arms 7, will result in such arm being swung upwardly, while the lever being moved away from the opposite arm 7, will result in such opposite arm being swung downwardly, somewhat in the manner of toggle actions. Thus, when the rudder 1 is turned toward the left, to make a left hand turn, the left hand aileron 5 is swung upwardly and the right hand aileron is swung downwardly, and the ailerons are swung in the opposite direction when the rudder is swung toward the right, so that the airship may make turns in the usual manner.

In the arrangement shown, the rudder 1 and ailerons 5 are connected directly with the shafts 2 and 6, but any suitable connections therebetween may be used.

Having thus described the invention, what is claimed as new is:

1. A steering gear for airships comprising a vertical shaft, a rudder connected to said shaft, lever arms mounted to turn on a horizontal axis, ailerons connected with said arms, a hand lever connected with said shaft to turn with same and adapted to be swung upwardly and downwardly, and links connecting said lever and arms.

2. A steering gear for airships comprising a shaft, a rudder connected with said shaft, a pair of lever arms, ailerons connected with said arms, a hand lever connected with said shaft to turn with same and movable toward and away from said arms, and links connecting said lever and arms.

3. A steering gear for airships comprising a vertical shaft, a rudder secured to said shaft, ailerons at opposite sides of said rudder mounted to swing about a horizontal axis, lever arms connected to said ailerons, a hand lever having a hinge connection with said shaft to swing toward and away from said arms and arranged to turn said shaft, and links connecting said lever and arms.

4. A steering gear for airships comprising a shaft, a rudder connected to said shaft, a pair of ailerons, a hand lever hingedly connected to said shaft to turn same and to swing toward and away from said ailerons, and links connecting said ailerons and lever.

5. A steering gear for airships comprising a rudder, a hand lever directly and operably connected to said rudder, and a pair of ailerons connected to said lever, said lever being mounted for swinging movements in a substantially horizontal plane to turn said rudder and to move the ailerons in opposite directions and also mounted for swinging movements in a vertical plane to move the ailerons in the same direction without turning the rudder.

6. A steering gear for airships comprising a rudder, a hand lever mounted for swinging movements in different planes at an angle to one another and directly and operably connected with said rudder to turn the rudder when said lever is swung in one of said planes, a pair of ailerons, and links connecting said lever and ailerons and arranged to swing the ailerons in the same direction when said lever is swung in the other plane and to pull one link and push the other link to swing the ailerons in opposite directions when the lever is swung in the first named plane.

In testimony whereof I hereunto affix my signature.

JESSE D. LANGDON.